Feb. 14, 1961 S. W. PETREY 2,971,282
PICTURE DISPLAY MEANS
Filed April 28, 1959
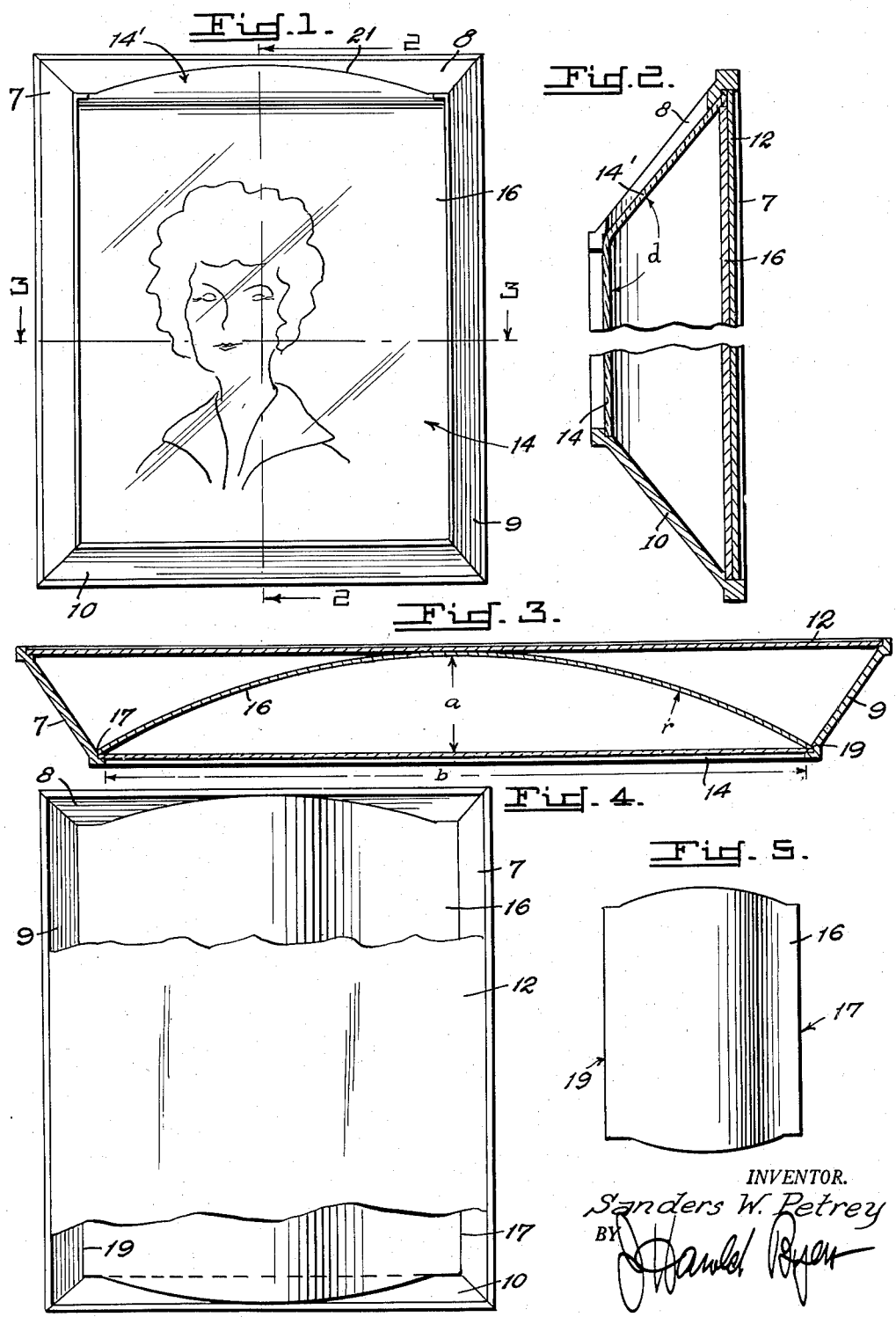
INVENTOR.
Sanders W. Petrey
BY United States Patent Office 2,971,282
Patented Feb. 14, 1961

2,971,282
PICTURE DISPLAY MEANS
Sanders W. Petrey, Petrey Studio, Hazard, Ky.
Filed Apr. 28, 1959, Ser. No. 809,408
4 Claims. (Cl. 40—152)

This invention relates to the pictorial arts and particularly to a frame construction for mounting a picture in a manner producing the visual effect of a three dimensional object.

Various methods of developing three dimensional effects are known. It has for example been endeavored to create an illusion of depth by simply mounting a picture upon a lens-shaped backing. There are a number of known methods which rely upon a stereopticon effect, whereby two images of a single object each photographed from a slightly different angle, are respectively presented to the right and left eye of the observer. These latter devices require the observer to distinguish the separate images without, however, perceiving them as a double image, but focussing them as in ordinary vision, which may require the aid of differentiating spectacles or other optical-mechanical means.

Such prior methods have either proved unsatisfactory in generating a satisfactorily realistic effect or require resort to photographic and viewing equipment that is complicated, inconvenient and expensive.

It is an object of the present invention to provide a relatively simple means of attaining a pleasing perspective effect with relatively simple means.

It is a further object of the invention to provide an improvement that is particularly adaptable to high quality photographs taken with standard professional equipment.

It is a further object of the invention to provide a means for mounting portraits that will bring out the lifelike characteristics that are latent in photographs.

Other objects will become evident in the course of the following description.

While I do not wish to be bound by any theoretical explanation of the novel effect that is obtained in the practice of my invention, it may be conducive to a better understanding thereof to point out certain basic premises. A standard portrait lens will transmit an image to the focal plane (in the camera) to a degree of sharpness that is related to the diameter of the opening in the lens as compared to the distance of the object. The depth of focus becomes greater as the aperture is decreased, and conversely becomes smaller with increase in the size of the aperture. Among other reasons for this deviation, it is to be considered that use of a wide aperture in closeup work such as bust portraiture allows rays of light from certain areas to converge on or substantially on the focal plane after passing through one "side" of the lens, while at the same time the rays from this particular limited area are by position blocked off from reaching the other "side" of the lens. The wider the lens opening, the greater is this deviation, and also when the lens is closer to the subject the deviation is correspondingly greater.

Although the image on the focal plane may be in acceptable focus, the image edges of the solid object or objects will show a certain lack of definition that may be described as "fuzzy." This blurring is at least in considerable part due to the passage of rays of light around the sides or edges of the object, whereas other areas of the lens are transmitting the rays which indicate the ending of the edges of the object more abruptly. Although these variations are very small, it nevertheless obtains that the focal plane image is to some degree a "wrap around" impression related and corresponding to the real, three-dimensional object. Thus, through a single lens there is conveyed an image which to a certain degree is analogous to bifocal vision. When, however, this same image is viewed as it appears on the developed negative or print this effect is not sensed as perspective by the observer and the negative or print conveys the impression of its own flatness.

I now have found that if the flat photograph taken with a single lens camera is caused to curve in a lateral direction a pronounced depth effect is introduced. I have further found that when such curved picture is mounted with a superposed flat sheet of transparent material thereover, an impression of the natural third-dimensional characteristic of the original object is developed to a remarkable degree. This pleasing effect may be further enhanced by suitable arrangement of the light falling on the picture.

*General description*

A photograph taken with a studio camera is reproduced in the size desired. A frame is now prepared having such dimensions that the picture when mounted therein will be compressed laterally and to such an extent as to take the shape of a section of a cylinder and present a concave surface toward the observer. The frame for such purpose should have the general shape of a shallow box or case, the aforesaid cylinder being in tangent contact with the plane constituting the back of the box. A sheet of transparent material such as glass or plastic is now extended across the front of the box in such manner as to form a window through which the picture will be viewed in final assembly. The effect of this arrangement upon the observer is that of a window through which is seen a reproduction in third dimensional relief.

Whereas the novel features which characterize the present invention will be pointed out with particularity in the claims annexed to and forming a part of this specification, for better understanding of the invention, and of its specific advantages and objects in use, description is herewith tendered of the details of a specific embodiment according to the invention.

Fig. 1 is a front elevation of a picture frame constructed in accordance with the invention.

Fig. 2 is a vertical section showing in enlarged detail the upper and lower parts of the frame as taken along line 2—2 of Fig. 1.

Fig. 3 is an enlarged cross section view of the frame taken along the line 3—3 of Fig. 1.

Fig. 4 is a rear elevation of the frame shown in Fig. 1 with the backing broken away in part to show the picture.

Fig. 5 is a rear elevation showing the outline of the picture as inserted in the frame.

Referring to Fig. 1 and Fig. 4, the frame shown is of rectangular outline and consists of sides 7, 8, 9 and 10, respectively. This frame, which may bear a suitable surface ornamentation, if desired, forms a relatively shallow box or case of trapezoidal cross section which may be visualized by reference to Fig. 3. The sides 7, 8, 9 and 10 converge in a forward direction whereby the frontal or window portion is of lesser area than the back portion. The back is closed by a flat sheet 12, of thin wood, plastic, cardboard or other suitable material. The front is covered with a sheet 14 of glass or transparent plastic, the main body whereof is flat. The main body of sheet 14 composes a vertical plane and is characterized by a lesser upper portion 14' which is directed at an angle $d$, to the main body. This upper portion as shown in Fig. 2, slants back to meet backing 12 at the upper edge thereof.

The picture 16 is of such width relative to the frame that when the edges 17 and 19 thereof are in coincidence with the sides 7 and 9 of the frame, the picture 16 is arched thereby assuming a shape corresponding to the surface of a right cylinder of rotation. Moreover, the dimensions of the picture with reference to the frame and backing are such as to bring the center of the picture into tangential relationship with the backing 12, as clearly appears in Fig. 3.

In view of the depth and shape of the frame in order to bring out the effect desired to best advantage it may be desirable to cut back the upper member 8 of the frame to admit more light to the picture. Referring to Fig. 1, the cut back portion of frame member 8 is indicated by the curved edge 21. The opening thus formed is covered by the curved back portion 14' of the transparent sheet 14 as shown in detail in Fig. 2.

I have found that the effect of perspective is best achieved if the curvature of the picture be maintained within certain determinable limits. The curve of the picture forms the surface of a portion of a right cylinder, which taken in cross section may be considered as the arc of a circle (16, Fig. 3). For best results it is necessary that this curvature should be deeper than that which will provide merely an ordinarily flat appearance, but should be shallower than that which will introduce a distorting or unnatural effect. Since the factors that determine a pleasing perspective effect necessarily vary to a certain extent depending upon the size and particular visual features of each picture, the radius of curvature selected will be within limits of selection as introduced by the skill of the photographer from the standpoint of artistry and involves evaluation of an appearance which may best be discerned by the practiced eye.

I have found, however, that for best results the curvature of the picture will not vary to any substantial extent from the relative measurements hereinafter set forth. Specifically, if the width of the mounted picture be taken as $b$ (Fig. 3) the radius of curvature shown as $r$ (Fig. 3) should be substantially equal to $b$. Assume now that the picture is to be fitted to a frame 16 inches in width (dimension $b$, Fig. 3). I find that best results are obtained if the picture is curved in an arc on the circumference of a circle which has a radius of approximately 15 to 17 inches. With a considerably lesser radius a loss of dimensional effect occurs and if the radius $r$ is considerably greater, a loss of the illusion of a third dimension in the appearance of the picture may occur. Following the foregoing directions, with a frame which provides space from edge to edge measuring from the inner edges of the frame ($b$, Fig. 3) of 16 inches, a curvature should be provided which will not vary substantially from a depth ($a$, Fig. 3) of about 2 inches.

Further modifications conforming to my invention and embodying the principles thereof may be made in view of the foregoing description.

I claim:

1. A quadrangular picture frame having two side members, an upper member and a bottom member, said members enclosing a three-dimensional space, the front and rear edges of said frame members respectively defining the front and rear openings of said frame, the front opening of said frame being covered with a transparent window member, the forward edge of said upper frame member being inwardly curved to form a recess extending substantially across the front opening of said frame, the curve of said recess being substantially tangent to the rear opening of said frame, said frame being adapted to receive an inwardly curved picture-bearing member extending from side to side of the front opening of said frame, the curvature of said picture-bearing member corresponding to the curvature of the forward edge of said upper frame member.

2. A picture frame as set forth in claim 1 wherein said frame converges forwardly whereby the front opening of said space is of lesser area than the rear opening thereof.

3. A quadrangular picture frame having two side members, an upper member, and a bottom member, said members enclosing a three-dimensional space, the front and rear edges of said frame members respectively defining the front opening and rear opening of said frame, the front opening of said frame being covered with a transparent window member, said front edge of said upper member being curved in an arc extending from side to side of said front opening of said frame, the center of said arc being closely adjacent to the plane of said rear opening of said frame and the ends of said arc being closely adjacent to the plane of said front opening of said frame, whereby light falling from a source above said frame will not throw a shadow within said space, and mounted within said frame, a quadrangular picture-bearing sheet having a width normally greater than the width of said front opening of said frame whereby when said picture-bearing sheet is inserted in said frame with its side edges closely adjacent the front edges of said side members of said frame, said picture-bearing sheet will be flexed to form a curved surface concave with respect to said front opening of said frame, the curvature of said picture-bearing sheet corresponding to the curve of said front edge of said upper frame member.

4. In combination a frame for mounting pictures, composed of a plurality of frame members, a single, unitary picture-bearing member mounted in said frame, said frame enclosing a three-dimensional space, and a transparent window member covering the front opening of said space, the uppermost of said frame members being inwardly curved to form a recess extending substantially across the front opening of said frame, said picture-bearing member being concave with respect to the front opening of said space and extending laterally to approximately the full width of said front opening.

References Cited in the file of this patent

UNITED STATES PATENTS

| | | |
|---|---|---|
| 678,012 | Maratta | July 9, 1901 |
| 1,632,138 | Johnson | June 14, 1927 |
| 2,055,201 | Leigh | Sept. 22, 1936 |
| 2,428,772 | Aranoff | Oct. 14, 1947 |
| 2,565,553 | Foley | Aug. 28, 1951 |
| 2,731,749 | Tarzian | Jan. 24, 1956 |
| 2,860,437 | Carroll | Nov. 18, 1958 |

FOREIGN PATENTS

| | | |
|---|---|---|
| 23,162 | Australia | Oct. 7, 1930 |
| 1,088,058 | France | Sept. 1, 1954 |
| 1,166,324 | France | June 16, 1958 |